United States Patent [19]

Witte

[11] Patent Number: 5,734,171

[45] Date of Patent: Mar. 31, 1998

[54] TELECINE SCANNER INCLUDING MEANS FOR DETERMINING AND AUTOMATICALLY CORRECTING VERTICAL AND HORIZONTAL PICTURE STEADINESS ERRORS IN CONTINUOUS-MOTION FILM DRIVE SCANNING

[75] Inventor: Karsten Witte, Darmstadt, Germany

[73] Assignee: U.S. Philips Corporation, New York, N.Y.

[21] Appl. No.: 701,415

[22] Filed: Aug. 22, 1996

[30] Foreign Application Priority Data

Aug. 26, 1995 [DE] Germany ............... 195 31 508.1

[51] Int. Cl.[6] ............................................. H04N 5/253
[52] U.S. Cl. .................... 250/559.02; 250/559.29; 348/97; 348/106; 352/224
[58] Field of Search ................. 250/559.02, 559.04, 250/559.29, 559.32; 348/97, 100, 106, 107; 352/224

[56] References Cited

U.S. PATENT DOCUMENTS 4,104,680  8/1978  Holland .
4,875,102  10/1989  Poetsch et al. ............ 348/97
4,903,131  2/1990  Lingemann et al. .
5,266,979  11/1993  Brown et al. ............... 352/224
5,600,450  2/1997  Kaye et al. .................. 348/99

FOREIGN PATENT DOCUMENTS 3736790  10/1987  Germany .

Primary Examiner—Stephone B. Allen
Attorney, Agent, or Firm—Edward W. Goodman

[57] ABSTRACT

A telecine scanner includes a device for determining and automatically correcting vertical and horizontal picture steadiness errors (film weave correction) during continuous-motion film drive scanning. To perform an optimum film weave correction, correction signals are derived from photosensors (11 and 13) arranged in the area of the film gate and scanning the sprocket holes during the entire scanning period of each film frame. The photosensor (11) provided for vertical correction includes a plurality of photoelements arranged transversely to the film drive direction and substantially corresponding to the number of television lines per film frame. The photosensor (13) provided for horizontal correction includes a plurality of photoelement sectors (14 to 21) arranged along the film edge, the photoelement sectors being smaller than a sprocket hole.

5 Claims, 2 Drawing Sheets ly correcting horizontal and vertical picture steadiness errors in constant-speed telecine scanning while using frame stores is known from DE 37 36 790 A1, corresponding to U.S. Pat. No. 4,903,131, in which horizontal and vertical error signals are determined. The start of scanning the first television line of a new film frame and, simultaneously, the start of reading video signals of the first television line of a new film frame, are fixed by the vertical error signals for the position of the film frame with respect to the scanning device in at least one frame store. The start of scanning of a new television line as against the start of reading a new television line is shifted by the horizontal error signals in at least one frame store. Frame start pulses and horizontal position values are generated from the horizontal and vertical error signals, with the frame start pulse being supplied only during a part of the scanning period and blocked during the remaining part of the scanning period. However, this has the drawback that a correction of the vertical position of the film frame is only performed at the start of scanning a film frame, but not during the further scanning period, which may lead to a shift of the vertical position within a frame.

SUMMARY OF THE INVENTION

It is therefore an object of the present invention to provide a telecine scanner of the type described in the opening paragraph, in which a correction of the film frame position is performed constantly, i.e., throughout the scanning period of each film frame.

This object is solved in that, for determining the vertical correction signals, a photosensor is arranged in the area of the film gate, this photosensor comprising a plurality of photoelements arranged transversely to the film drive direction and substantially corresponding to the number of television lines per film frame, in that the width of the photosensor substantially corresponds to the sprocket hole strip width, and the length of the photosensor substantially corresponds to the height of a film frame. The photosensor is illuminated through the sprocket hole strip, while, in the case of continuous-motion film drive, a contrast range per photoelement is generated by the front edge of a sprocket hole via the photosensor, and in which a read-out start pulse for the line sensors is derived only from the contrast ranges of a reference sprocket hole. For determining the horizontal correction signals, a further photosensor, comprising a plurality of photoelement sectors and extending in the area of the film gate along the film edge and in the area of the sprocket holes of each film frame, is provided, in which each photoelement sector is smaller than a sprocket hole. The further photosensor is also illuminated through the sprocket hole strip, while a partial illumination of a photoelement sector is evaluated via the further photosensor in the case of continuous-motion film drive when the reference sprocket hole is present in the center of the photoelement sector, while a correction signal for the horizontal offset of the frame store read-out is derived from the ratio between non-illuminated and illuminated photoelements.

The telecine scanner according to the invention has the advantage that an optimum film weave correction is achieved, even in real-time high resolution scanning.

The number of lines read out is directly adapted to the motion fluctuations. Thus, it is not attempted to minimize the causes of the errors (film frame tracking fluctuations), but to compensate the inevitable tracking fluctuations which are still present in known devices, or exactly track the CCD line-read clock in accordance with the occurring tracking fluctuations. The read-out instant is therefore no longer directly time-dependent, but directly spatially dependent.

These and other aspects of the invention will be apparent from and elucidated with reference to the embodiments described hereinafter.

DESCRIPTION OF THE PREFERRED EMBODIMENT

Figure 1:
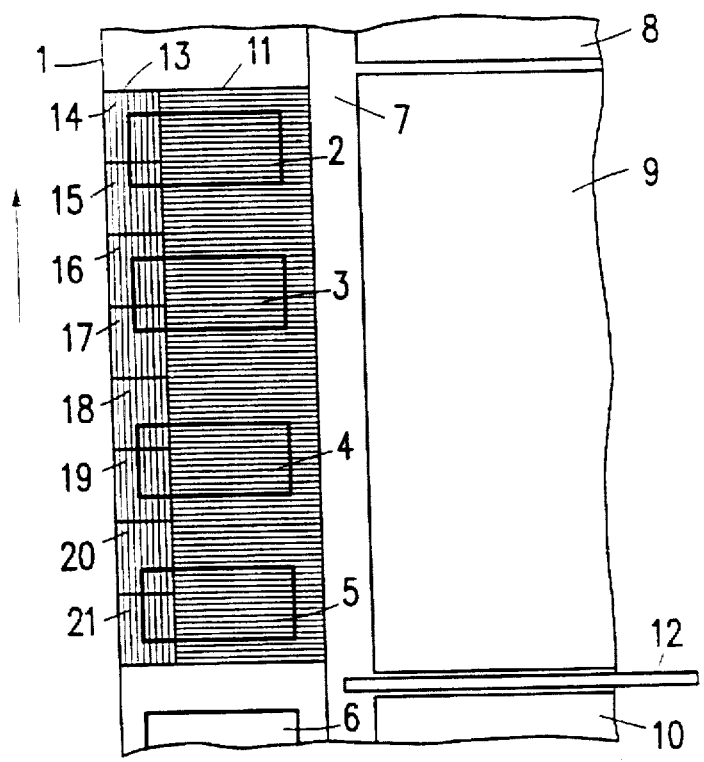
FIG. 1 shows the arrangement of the two photosensors relative to the sprocket holes of the film.

FIG. 1 shows the device, according to the invention, with a section of a 35-mm motion film 1 which has a strip with sprocket holes 2 to 6 in the area of its left edge. A continuous optical sound strip 7 is provided at the right. The partially shown film frames 8, 9, 10, in which four sprocket holes, for example, 2, 3, 4, 5, are associated with the film frame 9, are shown to the right of the strip 7. The first sprocket hole 2 of each film frame is the reference sprocket hole denoted, for example, as a Mitchell hole.

To derive the vertical correction signals, a first photosensor 11 is provided, which comprises a plurality of photoelements, for example, photodiodes or phototransistors, extending transversely to the film drive direction and corresponding to the number of scanning lines of a film frame. The width of the first photosensor substantially corresponds to the width of the sprocket holes, while its length substantially corresponds to the height of a film frame. The photosensor 11 arranged on the rear side of the motion film 1 is illuminated through the sprocket hole strip by means of a light source (not shown) so that a contrast range per photoelement is generated by the front edge of a sprocket hole in the case of continuous-motion film drive in the direction of the arrow. The film frames 8, 9, 10 are simultaneously scanned with CCD line sensors 12, only one of which is shown in the Figure.

To derive the horizontal correction signals, a second photosensor 13 is arranged at the area of the left edge of the motion film 1 and the sprocket holes. It comprises, for example, eight sectors 14 to 21 each having a plurality of photoelements extending in the film drive direction. The photosensor 13, which is also arranged on the rear side of the motion film 1, is illuminated through the sprocket hole strip by means of said light source, so that a partial illumination of one of the sectors 14 to 21 through the left edge of a sprocket hole is evaluated via the second photosensor 13 in the case of continuous-motion film drive when the reference sprocket hole is present in the center of the sector. A correction signal for the horizontal offset of the read-out of the frame store (not shown) is derived from the ratio between the illuminated and non-illuminated photoelements. Since the second photosensor 13 is divided into eight sectors, eight correction values per film frame can be generated. For the horizontal error evaluation, only the photoelement which is just scanning the reference sprocket hole should be evaluated. The instant of evaluation starts with the entrance of the left edge of the reference sprocket hole into the relevant sector and ends with its exit. The relevant photoelement should be sensitized during this period.

Figure 2A:
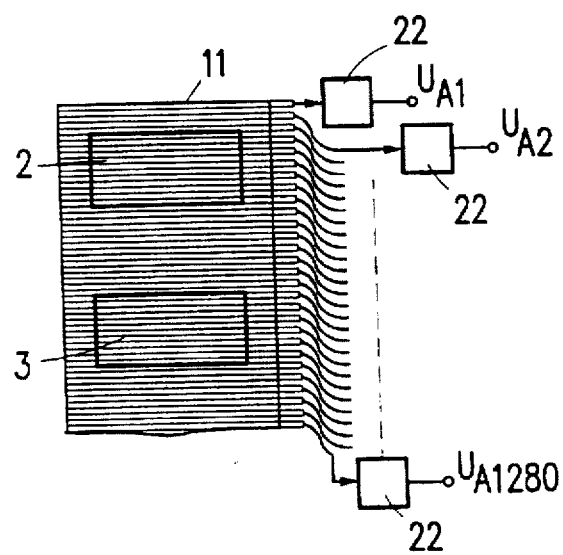
FIGS. 2A and 2B show an arrangement for deriving the vertical correction signals.
Figure 2B:
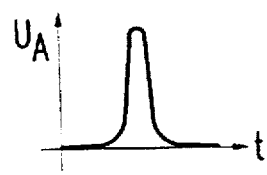

FIG. 2a shows only a part of the first photosensor 11 with the sprocket holes 2 and 3. The strip-shaped photoelements each have an output connected to a TTL logic circuit 22. In the continuous motion of the illuminated sprocket holes via the photosensor 11, the front edges generate an increase of the luminance, yielding, in a differentiated manner, a pulse (FIG. 2b) of approximately 2 µs by means of the TTL logic circuit 22.

Figure 3:
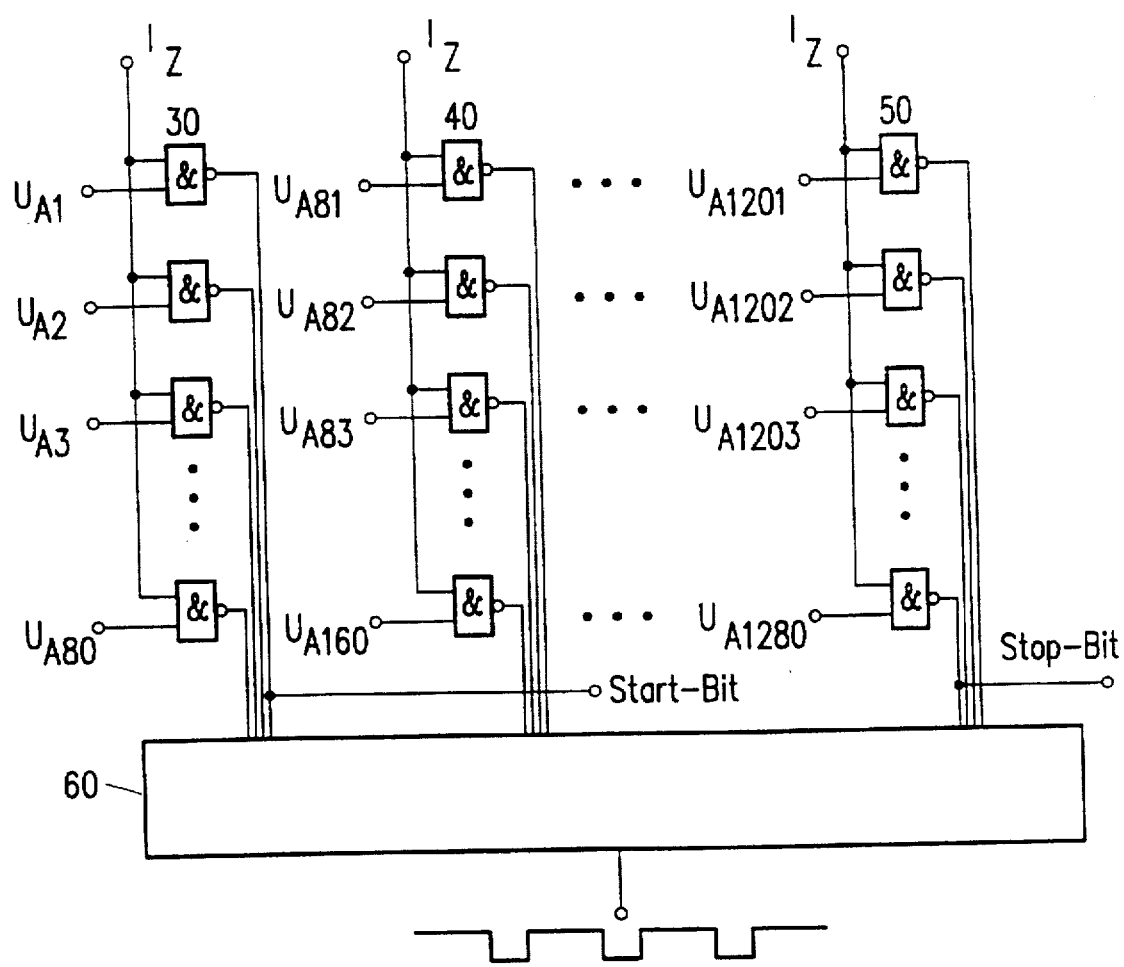
FIG. 3 shows a block diagram for deriving the readout-start pulses.

This pulse is now supplied via a masking circuit shown in FIG. 3, in which only the pulses are passed by the front edge of the reference sprocket hole, whereas all other pulses are faded out by sprocket holes which are not relevant. The masking circuit consists of a multitude of AND-gates which are arranged in groups. The first group of AND-gates 30 receives the pulses from a plurality, for example 80, juxtaposed photoelements and the information $I_x$ derived from the sprocket-tacho pulse. The second group of AND-gates 40 receives the pulses of the subsequent group of juxtaposed photoelements, for example as far as photoelement 160. For the sake of clarity, only the last group of AND-gates 50 is shown which receives the pulses of the last, for example, 80, elements up to photoelement 1280. The outputs of all the AND-gates 30 to 50 are negated and applied in groups to the inputs of a further logic AND-circuit 60. The read-out start pulses for the line sensors can be derived from the output of this circuit 60. The start and stop bits of the first and last photoelements are once more separated out after the masking operation, because they may be required as reference values (V pulses, valid bits).

Figure 4:
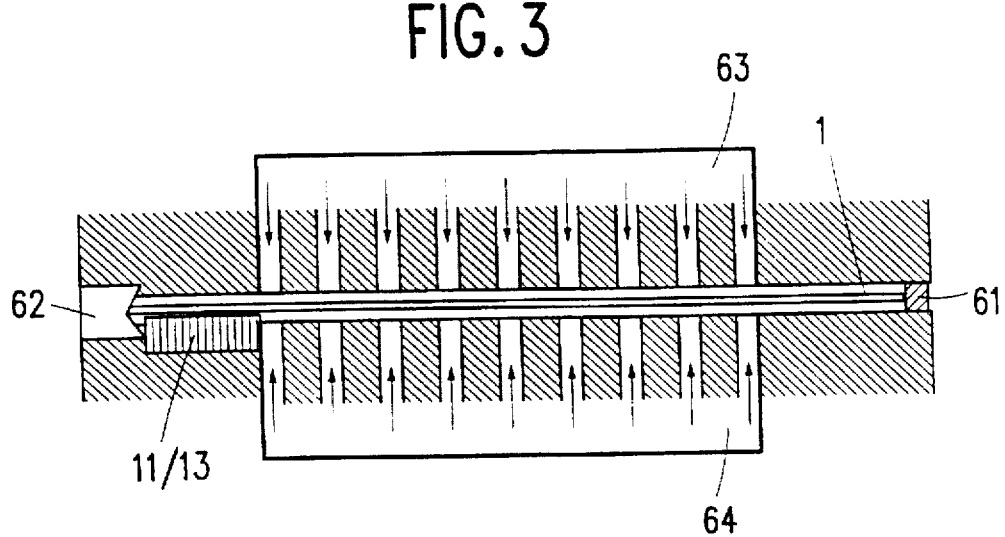
FIG. 4 is a cross-section of the film guide in the area of the film gate.

FIG. 4 is a cross-section of the film guide in the area of the film gate. Since the photosensors can only be plane-manufactured, it is important that the film can also be plane-guided in the area of the film gate. The motion film 1, guided perpendicularly to the plane of the drawing, is essentially held at the same distance from the line sensor optical system (not shown) and the photosensors 11 and 13 by means of an air cushion. In this way, the film is stressed only at its film edges by the horizontally operating guiding elements 61, 62. The air cushion itself is constituted by air chambers 63 and 64 on the upper and lower side of the film, these chambers being connected to a plurality of air supply ducts having a diameter of approximately 1 to 1.5 mm. Normally, the upper and lower side of the film guide should be fed with an even air pressure. However, it is also possible to mechanically readjust, if necessary, a predetermined mechanical film tension by means of an intentionally different air pressure or by means of a specially adapted diameter of separate air supply ducts proximate to the CCD line sensors.

I claim:

1. A telecine scanner comprising a device for determining and automatically correcting vertical and horizontal picture steadiness errors in continuous-motion film drive scanning, while using line sensors and frame stores, in which vertical and horizontal correction signals are determined by scanning a strip of sprocket holes in the film characterized in that said telecine scanner comprises, for determining the vertical correction signals, a first photosensor arranged in an area proximate to a film gate of said telecine scanner, said first photosensor comprising a plurality of photoelements arranged transversely to a film drive direction and substantially corresponding to a number of television lines per film frame, a width of the first photosensor, corresponding to a length of the photoelements, substantially corresponding to a sprocket hole strip width and a length of the first photosensor substantially corresponding to a height of a film frame, the first photosensor being illuminated through the sprocket hole strip, wherein, in the case of continuous-motion film drive, a contrast range per photoelement is generated by a front edge of a sprocket hole via the first photosensor, a read-out start pulse for the line sensors being derived only from the contrast ranges of a reference sprocket hole, said telecine scanner further comprising, for determining the horizontal correction signals, a second photosensor comprising a plurality of photoelement sectors and extending in an area proximate to the film gate along an edge of the film edge and in an area proximate to the sprocket holes of each film frame, each of said photoelement sectors being smaller than a sprocket hole, the second photosensor being also illuminated through the sprocket hole strip, wherein a partial illumination of a photoelement sector is evaluated via the second photosensor in the case of continuous-motion film drive when the reference sprocket hole is present in the center of said partially illuminated photoelement sector, while a correction signal for a horizontal offset of a frame store read-out is derived from the ratio between non-illuminated and illuminated photoelements.

2. A telecine scanner as claimed in claim 1, characterized in that said telecine scanner further comprises means for differentiating each voltage transient generated by the contrast ranges of the first photosensor, and means for fading out by masking the voltage transients generated by the non-relevant sprocket holes so that only the voltage transient derived from the reference sprocket hole generates the read-out start pulse for the line sensors.

3. A telecine scanner as claimed in claim 2, characterized in that a given number of juxtaposed photoelements is arranged in groups, the outputs of the photoelements within a group subsequent to the differentiating circuit being combined in a logic AND circuit with the information signal ($L$) derived from the sprocket-tacho pulse, all outputs of all groups being subsequently also combined in a logic AND circuit, and each read-out start pulse being derivable in an inverted form from the output of this logic AND circuit.

4. A telecine scanner as claimed in claim 1, characterized in that the sprocket hole strip is illuminated with directed light in the area of the first and second photosensors.

5. A telecine scanner as claimed in claim 1, characterized in that a film guide of the telecine scanner in an area proximate to the film gate is planar, a plurality of ducts for supply air being provided in the film guide in this area, said ducts being connected to two air chambers at upper and lower sides of the film guide so that the film is guided on an air cushion in the case of an even air pressure in the two air chambers.

* * * * *